United States Patent [19]

Tanaka

[11] 4,238,446
[45] Dec. 9, 1980

[54] METHOD FOR MOLDING BLIND RIVET

[75] Inventor: Toshie Tanaka, Machida, Japan

[73] Assignee: Nifco Inc., Yokohama, Japan

[21] Appl. No.: 15,837

[22] Filed: Feb. 27, 1979

[30] Foreign Application Priority Data

Feb. 28, 1978 [JP] Japan ................................ 53-21557

[51] Int. Cl.³ .......................... B29D 3/00; F16B 19/10
[52] U.S. Cl. ........................................ 264/250; 85/37;
85/77; 85/79; 264/271; 264/328.1; 425/542;
425/567; 425/DIG. 227
[58] Field of Search ...................... 264/250, 328, 271;
85/77, 78, 37, 38, 39, 79, 85; 425/517, 542, 567,
568

[56] References Cited

U.S. PATENT DOCUMENTS

| 3,244,801 | 4/1966 | Dozier | 85/77 X |
|---|---|---|---|
| 3,272,060 | 9/1966 | Morin | 85/77 |
| 3,385,158 | 5/1968 | Morin | 264/250 X |
| 3,501,790 | 3/1970 | Wickers | 85/77 X |
| 3,651,734 | 3/1972 | McSherry | 85/37 X |
| 3,933,967 | 1/1976 | Taylor | 264/250 X |
| 3,938,657 | 2/1976 | David | 85/37 X |
| 4,002,099 | 1/1977 | Bradley et al. | 85/78 X |
| 4,083,289 | 4/1978 | Erickson | 85/77 X |

FOREIGN PATENT DOCUMENTS 2277265  1/1976  France ......................................... 85/77

Primary Examiner—Philip Anderson
Attorney, Agent, or Firm—J. R. Halvorsen; T. W. Buckman

[57] ABSTRACT

In a method for the injection molding of a plastic blind rivet of the type essentially consisting of a shank and a rivet body such that an upward slide of the shank relative to the rivet body causes the leading end of the rivet body to expand outwardly and the outward expansion of the rivet body enables the rivet to be fastened to a panel, the improvement which comprises forming a ring gate in the lower end of the cavity of a second die used for molding a rivet body around a shank molded in advance in a first die, whereby the molten plastic material for the rivet body is allowed to flow through the ring gate into the rivet-body cavity of the second die with high uniformity, whereby the rivet body is produced free from a weld line and consequently from the possibility of sustaining cracks under the force exerted thereon when the shank is slid upwardly therein.

4 Claims, 11 Drawing Figures

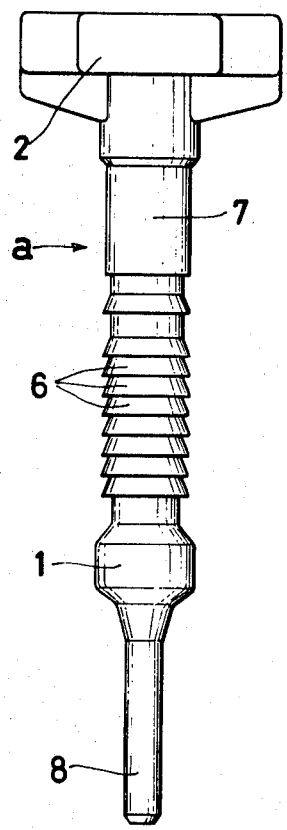
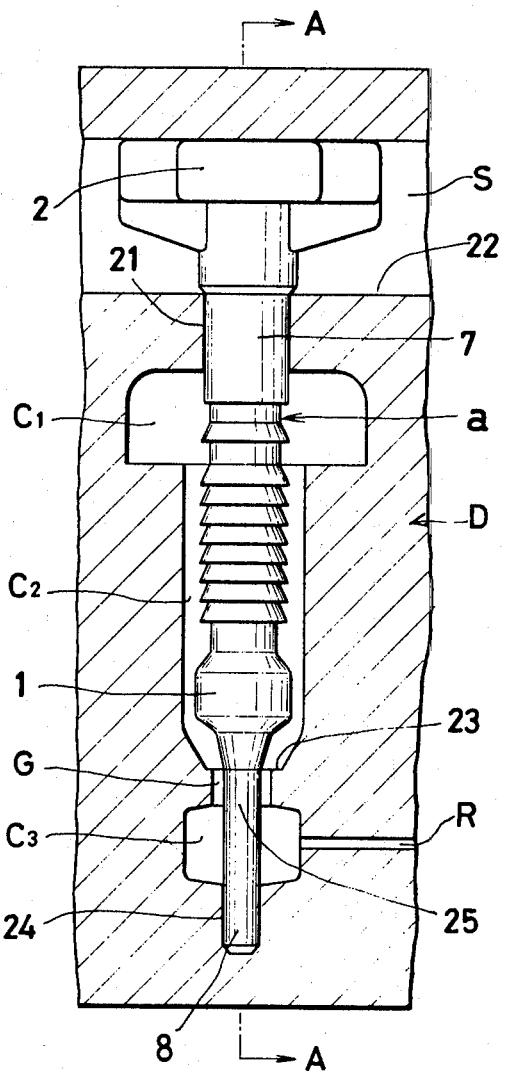

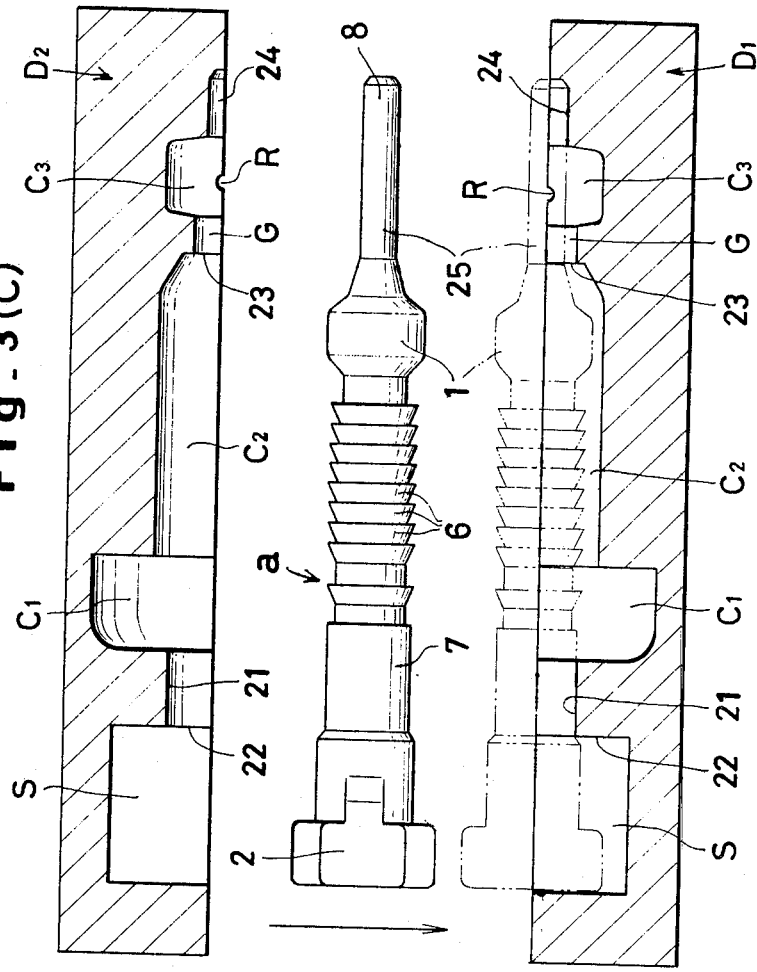

METHOD FOR MOLDING BLIND RIVET

BACKGROUND OF THE INVENTION

This invention relates to a method for the injection molding of a blind rivet comprising a shank and a rivet body formed around the shank so that an upward slide of the shank relative to the rivet body causes the rivet body to expand outwardly and the outward expansion of the rivet body enables the rivet to be fastened to a given panel by causing the panel to be squeezed between the expanded portion of the rivet body and a radially projecting head of the rivet body.

Ordinary blind rivets comprise a shank having a radially projecting lower end and a rivet body formed to enclose the shank tightly therein. To join two panels to each other, for example, this blind rivet is inserted in registered holes perforated in advance in the two panels, with the lower end of the rivet body in the lead and, then, the shank is slid up the rivet body so that its radially projecting lower end causes the rivet body to spread out radially. Consequently, the radially spread portion of the rivet body presses the two panels against the radially projecting head portion of the rivet body so fast that the two panels are brought into tight mutual adhesion. After the panels have been joined, it is usual practice to cut off the portion of the shank which protrudes from the rivet body and will no longer serve its purpose.

It is obvious that the force with which the blind rivet holds the panels in tight adhesion can be increased by simply increasing the extent to which the portion of the rivet body protruding past the panels is spread out radially by the upward slide of the shank.

Such an increase in the extent of the radial spreading of the rivet body can be realized by simply increasing the diameter of the radially projecting lower end of the shank. If the diameter is excessively increased, however, there ensues a possibility that the rivet body surrounding the shank will sustain cracks or the shank itself will break.

An excellent blind rivet which is capable of holding the panels with enhanced force and, further, sealing the holes perforated in the panels with perfect water-tightness heretofore unattainable by any existing blind rivets was previously developed and put to actual use by the inventor. The salient feature of this blind rivet resides in the rivet body being so adapted that the upward slide of the shank relative to the rivet body will cause the rivet body to be bent and folded over itself to increase the diameter thereof consequently, in contrast to the principle of the conventional blind rivet wherein the rivet body is spread out radially by the upward slide of the radially projecting lower end of the shank. Consequently, the inventor's blind rivet enjoys a greater increase in the diameter of the rivet body and permits the panels to be held in fast adhesion with enhanced force and the holes in the panels to be sealed with perfect water-tightness. Here again, due precaution must be exercised so that the rivet body made of a synthetic resin should not sustain cracks when it is deformed and finally folded over itself by the upward slide of the shank. An attempt to preclude the occurrence of such cracks solely by giving ample thickness to the wall of the rivet body is not desirable. When a synthetic resin is injection molded to produce a shaped article, the molten resin does not uniformly flow into the cavity of the die and, therefore, solidifies non-uniformly. In the injection molding of a hollow shaped article, for example, when the molten resin is injected through one injection orifice, the flow of the molten resin is divided by the core in the die which corresponds to the hollow space in the shaped article into two streams, which then wrap around the core corresponding to the shank placed in the second die used for molding the rivet body and eventually join again in one plane within the die. The plane wherein the streams of the molten resin join as described above is generally called a "weld line", which forms the most vulnerable part of the shaped resin article. In the case of a blind rivet to be produced by this technique, if the wall of the rivet body is thin, then the rivet body tends to sustain cracks along this weld line when the shank is slid up the rivet body. To prevent the occurrence of such cracks along the weld line, it has been usual practice to increase the wall thickness of the rivet body or minimize the extent of the radial spreading of the rivet body due to the upward slide of the shank. Either of the measures involves an unwanted sacrifice of operational ease or gripping force of the rivet. The method described above, therefore, is hardly suitable for the manufacture of the blind rivet previously developed by the inventor wherein the rivet body is bent out of shape and eventually folded over itself by the upward slide on the shank.

An object of the present invention is to provide a method for the injection molding of a plastic blind rivet consisting essentially of a shank and a rivet body such that the upward slide of the shank relative to the rivet body causes the rivet body to be bent and eventually folded over itself and the consequent increase in the wall thickness of the rivet body enables the rivet to be fastened to a given panel and the hole perforated in the panel to be sealed with perfect water-tightness, which method comprises preventing the produced plastic blind rivet from sustaining structural flaws such as, for example, uneven resin distribution and occurrence of weld line which degrade the product quality.

SUMMARY OF THE INVENTION

In the first die to be used for molding the shank, a thin rod is disposed as a position indicator in the lower end of the die. In the second die to be used for molding the rivet body round the shank, a ring gate is formed round the thin rod. Consequently, the molten plastic material which has flowed through the runner and the pouring basin is caused to flow axially through the ring gate uniformly in the upward direction. Thus, the molten plastic material has no possibility of producing any weld line. Generally a shaped article which has no weld line sustains no cracks under external force even when the wall thickness is relatively small. In the case of the blind rivet, therefore, there is produced a structure wherein the rivet body is safely bent and folded over itself by the upward slide of the shank.

The other objects and characteristics features of the present invention will become apparent from a detailed description of the invention to be given hereinafter with reference to the accompanying drawing.

BRIEF EXPLANATION OF THE DRAWING

FIG. 3(A) is a side view of a typical shank to be produced in the process of the molding method as the first preferred embodiment of the present invention.

FIG. 3(B) is a plan view in the sectioned or split surface of the die to be used for the preferred embodiment, with a shank set in position in the die.

FIG. 3(C) is a longitudinally sectioned view taken along the line A—A of FIG. 3(B).

DETAILED DESCRIPTION OF THE INVENTION

Figure 1A:
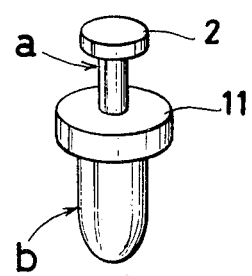
FIG. 1(A) is a perspective view of the first conventional blind rivet to which the molding method of the present invention can be applied.
Figure 1B:
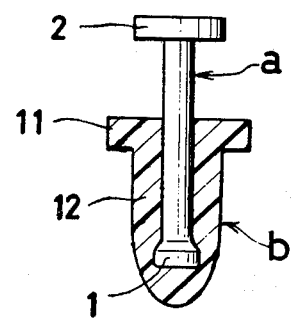
FIG. 1(B) is a longitudinally sectioned view of the rivet body of the conventional blind rivet.
Figure 1C:
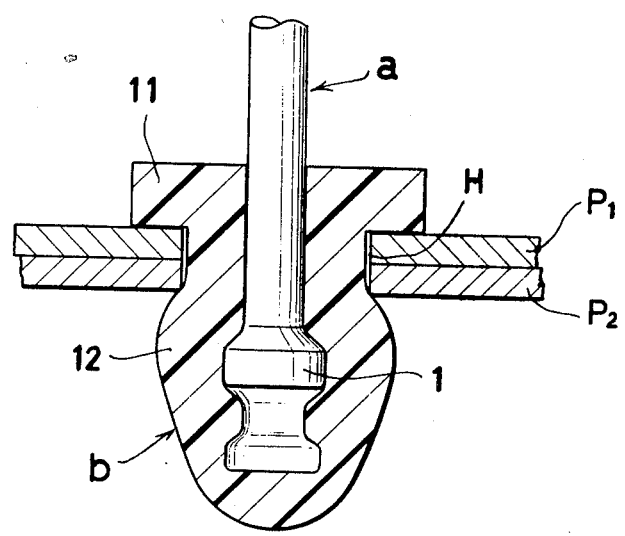
FIG. 1(C) is a longitudinally sectioned view of the rivet body in a state assumed after the rivet has been bound to a part.

Blind rivets which have heretofore been suggested in the art are represented by the one illustrated in FIGS. 1(A)–(C) and that of FIGS. 2(A)–(D) developed by the inventors. To be particular, the first rivet illustrated in FIGS. 1(A)–(C) has a construction wherein a rivet body b closed at the bottom and having an enveloping wall completely closed throughout the entire circumference thereof is disposed around a shank a and this shank has its lower end radially expanded within the interior of the rivet body. For the purpose of binding two sheet-like parts $P_1$, $P_2$, this rivet is inserted with the lower end of the rivet body in the lead into registered holes H bored one each in the parts, the head portion 11 of the rivet body is brought into contact with and pressed against one side of the openings and the head portion 2 of the shank is drawn out by the head portion 2 thereof. Consequently, the radially expanded portion 1 of the shank moves up the interior of the rivet body b, departing from its original position and advancing toward the upper portion with a smaller inside diameter. In consequence of this upward movement, the immediately adjacent portion of the enveloping wall 12 of the rivet body is radially expanded outwardly, with the thickness of the enveloping wall retained intact. The outer surface of the radially expanded portion of the enveloping wall consequently presses the parts $P_1$, $P_2$ against the head portion 11 and, at the same time, the portion of the enveloping wall positioned within the bored holes H is more or less expanded outwardly into tight contact with the inner wall of the holes. Once the rivet has completed the binding of the parts, the portion of the shank a which protrudes from the head portion of the rivet body is no longer necessary and, generally, is removed from the remainder of the rivet by cutting.

FIGS. 2(A)–(D) depict a modification of this rivet, the modification being aimed at increasing the ratio of the radial expansion of the rivet body to the amount of upward movement the shank is required to make and also enhancing the ability of the rivet to bind itself with the parts or bind the parts with each other.

Similarly the shank a is enclosed in a blind manner to a certain portion of its entire length with the rivet body b throughout the entire circumference thereof. This rivet body b, compared with that of the rivet first described above, has a small wall thickness relative to the entire volume of the rivet and the expanded lower end portion 1 of the shank is unseparably bound with the lower end portion 13 of the rivet body. Consequently, these two end portions, unlike those in the first rivet, are never allowed to function separately of each other. This unseparable binding force is attained by radially expanding the lower end portion of the shank and giving thereto flat shoulder surface 3, or causing a plurality of ribs 4 to protrude from the peripheral surface of the lower end portion of the shank, or causing the lower end portion 1 of the shank to be fused, as surfacially, with the lower end of the rivet body by leaving the lower end portion 1 of the shank uncoated with the mold-release agent when the molded shank a has been set in position within the second die for the molding of the rivet body. In any event, the force with which the lower end of the shank and the lower end of the rivet body are bound with each other is stronger than the force exerted between the enveloping wall portion 12 of the rivet body and the corresponding portion 5 of the shank.

Figure 2A:
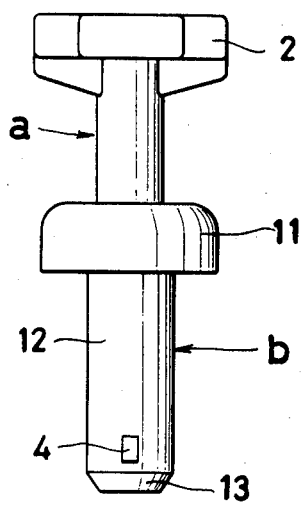
FIG. 2(A) is a side view of the second conventional blind rivet to which the molding method of this invention can be applied.
Figure 2B:
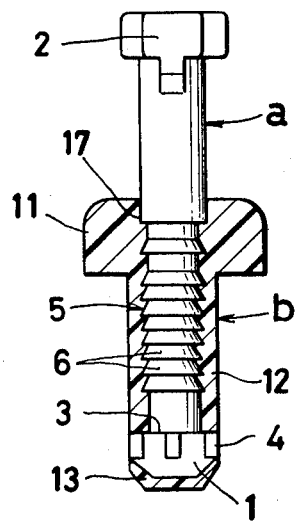
FIG. 2(B) is a longitudinally sectioned view of the same blind rivet.
Figure 2C:
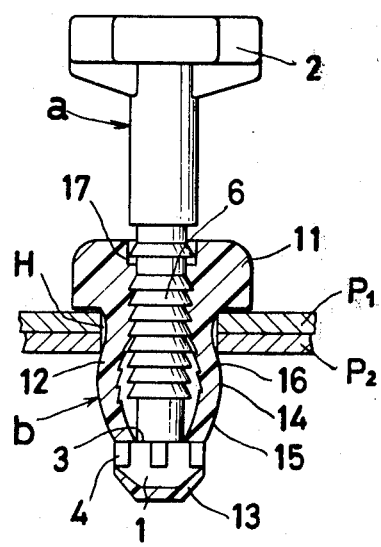
FIG. 2(C) is a longitudinally sectioned view of the same blind rivet in a transient state in which the rivet is bound to the part.
Figure 2D:
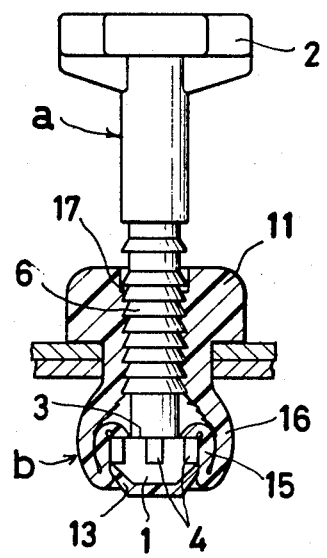
FIG. 2(D) is a longitudinally sectioned view of the rivet in a state assumed after completion of the binding of the rivet to the part.

So the rivet body b is inserted with its lower end in the lead into the fitting hole H bored in the parts $P_1$, $P_2$ and then the head 11 of the rivet is pushed down and the shank a is moved upwardly by the head 2 pinched between a thumb and fingers. As the result, the enveloping wall portion 12 of the rivet body is radially expanded in the shape of a barrel at first as illustrated in FIG. 2(C). As the upward movement of the shank a is further continued, the rivet body shortly reaches the point where it ceases to offer effective resistance to the compressive force being exerted by the lower end of the shank. The portion 15 immediately underlying the most expanded portion 14 begins to bend as if it it were folded into the interior of the upper portion 16 as illustrated in FIG. 2(D).

Moreover, since the upper portion 16 of the enveloping wall is radially expanded to a great extent by the forced entry of the thick-walled lower portion 15 of the enveloping wall instead of being simply expanded by the lower end of the shank, the force exerted to squeeze the parts $P_1$, $P_2$ is extremely strong, the degree of the radial expansion is great relative to the amount of upward movement the shank is required to make and the operating efficiency of the rivet is high. Further, at the time that the rivet has bound the parts with each other or has bound itself with the parts as illustrated in FIG. 2(D), the series of engaging teeth 6 disposed on the shank are unreturnably meshed with the lock steps 17 formed on the inner wall surface of the rivet body and prevent the shank from returning to its original position. At the same time, the resilient force due to elasticity which tends to return the shank is converted into a force which works in the direction of enhacing the engagement between these step means so as to retain the bound state at all times with a force slightly stronger than is needed. Again, the portion of the shank which protrudes serves no useful purpose any more and is, generally, removed from the remainder of the rivet by cutting.

At any rate, the rivet of this type enjoys high water tightness because it closes both sides of the fitting hole H and comes into contact with the edges of the fitting hole with high intimacy, because the interior of the rivet body is completely sealed throughout the entire circumference and additionally because the rivet body has a substantially blind bottom. The powerful binding force and further the high water tightness which the rivet enjoys originate from the fact that the rivet body b is made of synthetic resin and, therefore, utilizes the resilience of its material to advantage. Nevertheless, this rivet poses problems which demand careful attention from the standpoint of fabrication.

Since the rivet body b is in the shape of a blind cylinder whose enveloping wall is completely closed throughout the entire circumference and even on the bottom, uneven flow may possibly occur in the injection of the resin into the molding cavity in the course of molding operation. If any uneven flow of the resin occurs at all, it is quite likely that when the rivet body is radially expanded or otherwise deformed, cracks will develop in the rivet along the weld line internally occurring in consequence of the uneven distribution of resin before the rivet body has reached the maximum level of the resilient deformation allowable from the design point of view. These cracks may possibly deprive the rivet of its ability to function as a rivet or, if it is still effective enough to provide required binding, or its water tightness. From the practical point of view, none of the methods heretofore developed for the molding of blind rivets of the type under review has attached any appreciable consideration to the problem of weld line encountered at the time of molding. Particularly in the case of the two-stage molding technique, namely, the technique involving the steps of first molding the shank and subsequently setting the shank in position within the second die for the molding of the rivet body and finally injecting the resin for rivet body into the cavity, ordinary side gates (gates constituted of fine orifices possessing rectangular, semicircular or other cross sections) have been used unsystematically.

This invention primarily aims to provide a molding method capable of producing a rivet whose blind-bottomed cylindrical (not necessarily circular but permissibly angular in cross section) rivet body, even when forcibly expanded radially or deformed otherwise, develops no crack ascribable to the presence of weld line until the deformation reaches the design limits, in other words, a molding method such that, during the molding in the second die, no weld line occurs at least within the enveloping wall of the rivet body which is functionally deformed more than any other part. Supplementarily, this invention aims to provide a molding method which involves preparatory incorporation, within the second die, of means adapted to aid in enabling the molded shank to be accurately set in position in the die and thereby fulfil a supplementary function for the aforementioned principal object.

Now, preferred embodiments of the present invention will be described in detail with reference to the accompanying drawing. First, the invention applied to the molding of a blind rivet based on the construction of FIG. 2 will be explained.

In the first place, in the manufacture of the rivet, where use of synthetic resin in all the parts, even including the shank, is contemplated, the shank a of a desired shape is molded in the first die (not shown) such as by injection molding. In the present preferred embodiment, the shank a of the desired shape is preparatorily molded in conjunction with a small-diameter rod 8 formed by extending the lower end portion 1 of the shank in a decreased diameter as shown in FIG. 3(A).

In the second stage of the molding, the rivet body b is formed around the shank a. The die used for this second molding has a construction as illustrated in FIGS. 3(B)–(C). For the most part, this die is not different from the die involved in the conventional molding method. With reference to the die of FIG. 3(C) wherein the lower half die $D_1$ is a stationary piece illustrated in FIG. 3(B) and the upper half die $D_2$ is a movable piece, the parts which are similar to those found in the conventional die are a cavity $C_2$ for molding the rivet body and a cavity $C_1$ for molding the head 11 of the rivet body. When the essential parts of the shank are set in position in the cavities (as indicated by the imaginary line within the stationary half die $D_1$ in FIG. 3(C), the central portion of the shank containing the series of engaging teeth 6, the radially expanded portion 1 at the lower end of the shank, etc. are held in suspension and, in the spaces consequently interposed between these portions and the inner wall surfaces of the cavities $C_1$ and $C_2$ the enveloping wall portion 12 and the head portion 11 of the rivet body are to be formed by injecting the resin into the spaces. For this purpose, a surface portion 21 serving to hold fast in position the head portion 2 of the shank or the adjacent portion 7 of the shank is formed in a cylindrical shape in the respective half dies $D_1$ and $D_2$. The head portion 2 of the shank may be given whatever shape is desired. It may be in a simple shape as shown in FIG. 1. In the case of a rivet so constructed that use of a specially designed tool is required for its fastening as illustrated in FIG. 2, the head portion 1b must be in a rather complicated shape suitable for tight gripping by the tool. Generally no special cavities conforming with such a head portion are excavated in the half dies $D_1$ and $D_2$ of the second die, but a spaces S of a simple shape serving the mere purpose of admitting the head portion is formed in the half dies $D_1$ and $D_2$. Generally, the wall portion 22 which defines the aforementioned space S and abuts the head portion of the shank and the surface portion 21 which holds fast in position the portion 7 of the shank (or the exposed portion of the shank protruding from the head portion of the rivet body) adjacent to the head portion are used as means for positioning the shank at one end thereof within the half dies $D_1$ and $D_2$ of the second die in the conventional molding method. In the case of the rivet illustrated in FIG. 1, however, no special positioning means is used with respect to the remaining end of the shank. In the rivet illustrated in FIG. 2, the ribs 4 are used as means for positioning the shank within the die. In any event, it has been customary to have the resin injected through side gates into randomly selected portions of the cavities.

With a view to remedying the disadvantage issuing from the conventional molding method, namely the disadvantage that the second die used therein is liable to cause occurrence of weld line in the enveloping portion of the rivet body, this invention aims to provide a molding method whereby the injection molding is effected through the medium of a ring gate disposed in the lower end portion 23 of the cavity $C_2$ for the molding of the rivet body, preferably at the substantial center of the end portion 23.

This ring gate is effectively incorporated by inserting within the cylindrical gate space G a core pin designed so as to leave an annular opening. Although this core pin generally may be disposed in the half dies $D_1$ and $D_2$, the present preferred embodiment has adopted an effective device in this respect.

As already described, the small-diameter rod 8 is formed by extending the lower end 1a of the shank a. One of the functions fulfilled by this rod 8 is to control the positioning within the die cavity of the shank on the side opposite the side of the head portion when the shank is set in position within the second die. The rod 3 thus serves much the same purpose as the ribs 1c of the rivet illustrated in FIG. 2. To permit this extension of the small-diameter rod 8, a supporting space 24 for receiving the leading end of the small-diameter rod 8 is formed in the half dies $D_1$ and $D_2$. The portion 25 of this small-diameter rod adjacent to the cavity $C_2$ for the molding of the rivet body passes through the center of the cylindrical gate space G without touching the inner wall surface defining the space G and, consequently, serves concurrently as a core ring capable of converting the gate space G into the ring gate.

This use of the ring gate in the die permits the flow of the synthetic resin around the shank a within the cavity $C_2$ for the molding of the rivet body in the direction of the head of the rivet body to be uniformized throughout the entire circumference and, consequently, causes the weld line which is suffered to occur at some point within the entire rivet to shift its site at least into the cavity $C_1$ for the molding of the head portion of the rivet body. Further in the present preferred embodiment, this ring gate is formed in a simple, convenient construction. Thus, this preferred embodiment has an advantage that the small-diameter rod which is easy and inexpensive to produce and which is formed integrally with the shank at the time of the molding of the shank in a manner extending past the lower end of the rivet body can be used in the place of the core pin which generally is difficult to manufacture and often proves to be expensive.

In the present preferred embodiment, owing to the position of the small-diameter rod functioning as the core pin for the ring gate G, the ring gate necessarily falls at the most desirable position, i.e. the center of the lower end portion of the cavity $C_2$ for the molding of the rivet body. From the standpoint of the principal object of this invention which resides in preventing the weld line from occurring in the enveloping wall portion of the rivet body, the position of the small-diameter rod need not be at the center of the lower end of the cavity $C_2$ but may be at any point in the lower end. If it is elected to provide a core pin on the die side in spite of the trouble entailed, then there is no need for incorporating the small-diameter rod 8 into the shank. In such case, the core pin may be fastened to the shank of a freely chosen shape as shown in FIGS. 1 and 2.

In the case of the rivet incorporating ribs 4 at the lower end of the shank as illustrated in FIG. 2, the presence of these ribs within the cavity of the second die has a possibility of causing turbulence in the flow of the synthetic resin while the resin is injected into the die. In comparison with the conventional molding method, however, the method of this invention which causes the flow of the injected synthetic resin to occur in straight lines from the lower end to the head portion of the rivet body with the aid of the ring gate permits the molded rivet body to acquire conspicuous toughness.

Conversely, the rivet which has the lower end 1 of the shank surrounded with the rivet body b as illustrated in FIG. 1 can be modified to equal the preferred embodiment illustrated in FIG. 3 by similarly extending the lower end of the shank into a rod of a reduced diameter and forming in the second die a cylindrical gate space for surrounding the small-diameter rod with an intervening space left therebetween. Consequently a similar ring gate is completed to produce the same effect when the molded shank is set in position inside the second die. Specifically for the purpose of the positioning of the shank within the second die, if the portion 25 defining the ring gate is extended by this small-diameter rod so much as to be supported by the supporting space 24 as in the case of the illustrated preferred embodiment, then there is formed a continuous space of an annular cross section with absolutely no obstacle between the inner wall surface of the cavity $C_2$ for the molding of the rivet body and the peripheral surface of the shank a. Coupled with the function of the ring gate, this space offers a notable effect in the uniformization of the flow of the synthetic resin.

In the case of the illustrated preferred embodiment, a pouring basin $C_3$ is formed at a point intervening between the runner R and the ring gate, so as to serve the purpose of rectifying the flow of the resin pouring in through the runner and then forwarding the rectified flow of the resin to the ring gate G.

Figure 4:
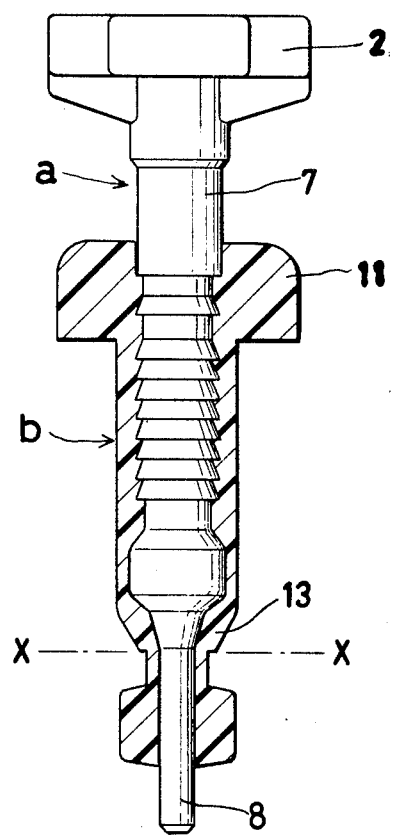
FIG. 4 is a longitudinally sectioned view of a blind rivet molded by the preferred embodiment of this invention.

The molding operation described above yields a product of the construction of FIG. 4. When the runner is cut, the resin remains at the portions corresponding to the small-diameter rod 8, the ring gate portion and the pouring basin in the path of the resin flow to the posterior of the lower end 13 of the rivet body. The rivet as produced functions effectively. Since the portion extending past the lower end 11 has no part in the function of the rivet, however, it may be cut off across the line X—X. This cutting is advantageous in the sense that it serves to reclaim the material and give the rivet a better appearance.

In the preferred embodiment just illustrated only one shank 1 is processed into one complete, independent rivet. This procedure, of course, is sufficient insofar as the principle of the operation is concerned. From the standpoint of mass production, however, this operation lacks efficiency. As generally practiced in the two-stage molding of blind rivets of the type under discussion, the first-stage molding for the production of shanks is carried out by using a die so designed that a plurality (on the order of 15, for example) of shanks are obtained all at once in one shot in a manner having their respective head portions arranged side by side and connected with intervening runners. The set of these shanks is then received in position within the second die possessing as many cavities so as to mold rivet bodies around the shanks, enabling the second-stage molding to be effected on all the shanks at once. The molding operation has its efficiency all the more enhanced when the first die and the second die are formed in one common stock. For example, one stock is halved with a flat plane. In the surface of each halved stock, a plurality of cavities for the molding of shanks are arranged side by side in one half of the total surface and as many cavities for the molding of rivet bodies around the aforementioned shanks are correspondingly arranged in the remaining half of the total surface. In the very first shot of the injection molding, an array of shanks are produced in the portion of the first-die cavities, while as many rivet bodies containing no shank are produced in the portion of the second-die cavities. Although these rivet bodies are useless, this wasteful shot occurs just once. Prior to the second shot of the operation, the array of shanks produced as described above in the first shot are set in position in the second-die cavities. Then, the second shot produces an array of finished rivets in the second-die cavities and, at the same time, produces as many shanks (for the third shot) in the first-die cavities. This procedure is thereafter repeated for the successive shots, notably rationalizing the molding operation as a whole.

As regards the material of which the shank of the rivet is made, there is no particular limitation. In some case, the shank may possibly be desired to be made of a metallic material. In that case, the first die and the second die are not formed in one common block but in two separate blocks.

In the description given above, the present invention has been portrayed as being significant as a method for the molding of a rivet which provides fast union by the radial expansion of the rivet body and high water tightness as illustrated in FIGS. 1 and 2. Besides, the present invention provides an ideal molding method for the manufacture of a rivet which is not allowed to contain any weld line in the enveloping wall portion of the rivet body or which is desired not to contain any such weld line. This invention, therefore, is effective in permitting the largest possible deformation to occur in the particular portion of the rivet intended to undergo resilient deformation at the time of the binding of the rivet by causing the weld line to shift its site to parts such as the head portion 11 (which may be formed in a desired shape such as, for example, a shape adapted for safe gripping) and keeping the weld line from appearing in the particular portion for the resilient deformation or in any other portions taking part in the principal function of the rivet. It is also effective in enhancing the binding force of the rivet. In one possible embodiment of this invention, a core pin for the ring gate may be attached in the form of a small-diameter rod to the shank and the core pin proves to be advantageous in terms of cost and ease of manufacture. At the same time, the core pin fulfills an additional, advantageous function of aiding in the positioning of the shank in the die.

What is claimed is:

1. A method for the two-stage molding of a blind rivet adapted to have a rivet body radially expanded by the upward movement of a shank comprising a first stage for molding a shank in a first die and a second stage for setting the essential part of the shank in position within the cavity of a second die for molding a rivet body and subsequently injecting a synthetic resin into the second die and thereby forming a rivet body around the shank, which method comprises allowing the injection of the synthetic resin into the cavity of the die for molding the rivet body to be effected through the medium of a ring gate disposed at the lower end of the cavity and thereby producing a uniform flow of the synthetic resin from said lower end through said rivet body cavity to the cavity for the molding of the head portion of the rivet body, said shank molded within the first die being provided on the lower end thereof with a rod of a smaller diameter extending from said lower end to a length past the lower end of the cavity for molding the rivet body, forming in the second die a gate cavity at the center of the lower end of said rivet body cavity, setting the essential part of the shank in position within said cavity and consequently allowing said smaller diameter rod of the shank to extend through said gate cavity, and resting in a complimentary cavity in said die thereby causing said gate cavity to be converted into said ring gate.

2. The method according to claim 1, wherein the ring gate is disposed at the center of the lower end of the cavity for the rivet body.

3. The method according to claim 1, wherein the leading end of the small-diameter rod of the shank is inserted within a supporting cavity disposed within the second die at a point beyond the gate cavity, said die including a substantially cylindrical cavity positioned axially intermediate, and communicating with said gate cavity and the rivet body cavity for the purpose of defining the ring gate said rod, at the same time, aiding in setting the shank in position within the second die, said gate cavity forming a pouring basin which rectifies the flow of resin from a runner before introduction into said ring gate.

4. The method according to claim 1 wherein the portion forming said ring gate in the second holding operation is cut off before use of said rivet.

* * * * *